United States Patent [19]

Anderson et al.

[11] 3,853,803
[45] Dec. 10, 1974

[54] METHOD OF PREPARING A CATIONIC ACRYLIC ELECTRODEPOSITABLE INTERPOLYMER

[75] Inventors: Carl C. Anderson, Hartland, Wis.; Lance C. Sturni, McKeesport, Pa.

[73] Assignee: PPG Industries, Inc., Pittsburgh, Pa.

[22] Filed: Apr. 2, 1973

[21] Appl. No.: 347,021

Related U.S. Application Data

[63] Continuation-in-part of Ser. No. 110,268, Jan. 27, 1971, abandoned.

[52] U.S. Cl.............. 260/29.6 TA, 260/29.2 EP, 260/29.2 N, 260/29.2 UA, 260/29.3, 260/29.4 UA, 260/78.5 BB, 260/78.5 BE, 260/78.5 UA, 260/80.6, 260/80.7, 260/80.72
[51] Int. Cl............................ C08f 1/13, C08f 45/24
[58] Field of Search. 260/29.6 TA, 78.5 E, 78.5 BB, 260/80.6, 80.7, 80.72, 80.73

[56] References Cited
UNITED STATES PATENTS

| | | | |
|---|---|---|---|
| 3,366,563 | 1/1968 | Hart et al.................. | 260/29.6 TA |
| 3,455,806 | 7/1969 | Spoor et al............... | 260/29.6 TA |
| 3,471,388 | 10/1969 | Koral........................... | 260/29.4 UK |
| 3,598,774 | 8/1971 | Hartzell et al............. | 260/29.6 MN |
| 3,703,596 | 11/1972 | Marx et al.................. | 260/29.6 TA |

Primary Examiner—Lucille M. Phynes
Attorney, Agent, or Firm—Joseph C. Gil

[57] ABSTRACT

Cationic electrodepositable, non-gelled, carboxy-containing, thermosetting acrylic interpolymers can be prepared by interpolymerizing the following monomers: (a) from about 40 to about 94 percent by weight of an alkyl ester of acrylic or methacrylic acid; (b) from about 5 to about 25 percent by weight of an alpha, beta-ethylenically unsaturated amino-alkyl monomer, wherein said amino group is selected from a member of the class consisting of a secondary amine and a tertiary amine; (c) from about 1 to about 15 percent of a monoethylenically-unsaturated carboxylic acid; and (d) from 0 to about 30 percent by weight of a copolymerizable ethylenically-unsaturated monomer, where the interpolymerization is carried out in the presence of an acid-solubilizing agent, where the acid has an ionization constant greater than that of the unsaturated carboxylic acid and is present in an amount sufficient to solubilize the interpolymer. The interpolymers herein can readily be admixed with a crosslinking agent to provide compositions that will electro-deposit at the cathode to produce films which, upon curing, have desirable properties, e.g., excellent corrosion-resistance to salt, alkali, etc. These films are free of the anodic dissociation discoloration which is prevalent in anodically-deposited compositions

12 Claims, No Drawings

METHOD OF PREPARING A CATIONIC ACRYLIC ELECTRODEPOSITABLE INTERPOLYMER

CROSS-REFERENCE TO RELATED APPLICATIONS

This application is a continuation-in-part of our co-pending application. Ser. No. 110,268, filed Jan. 27, 1971, now abandoned.

BACKGROUND OF THE INVENTION

The electrodeposition of coating composition has become a fast growing industry. A wide variety of resinous compositions have been applied to obtain desirable results. Most of the compositions utilized today are of an anionic nature, that is, the compositions are deposited on the anode. However, many disadvantages have been encountered by employing such compositions. For example, because of their acidic nature, anodic compositions tend to be sensitive to common types of corrosive attack, e.g., by salt, alkali, etc., and anodic deposition tends to place the uncured coating in proximity to metal ions evolved at the anode, thereby causing undesirable staining. The staining due to the anodic dissolution causes a particular problem whenever light or pastel coating compositions are employed.

In addition, it is a peculiarity of anodic electrophoretic coating methods that nascent oxygen is produced at the anode, which may react with the resinous polymers to produce bubbles or voids in the deposited films. Thus, such films are often lacking in resistive properties.

Recently, an extended effort has been put forth to develop heat curable cathodic electrodepositable compositions, thus alleviating the staining due to the anodic dissolution and improving resistive properties. Although nascent hydrogen develops at the cathode during the cathodic electrophoretic coating process, no metal ions pass into the coating solution or are present in the deposited film. Generally, the amount of nascent hydrogen produced at the cathode does not have the same deleterious effects on the properties of the deposited film as does the nascent oxygen produced during anodic deposition. Some of the cathodic resins known include dispersions of salts of nitrogen basic cathodic polymers, such as copolymers derived from an aminoalkyl acrylate, amides, alkyl acrylates or methacrylates and ethylenically-unsaturated monomers; aqueous coating compositions comprising acid-solubilized, iminemodified, carboxylic acid-containing acrylic resins; cathodic polyepoxide compositions; and aqueous coating compositions comprising blocked organic polyisocyanates and synthetic polyamine resins.

The cathodic coating compositions which contain an unsaturated carboxylic acid usually require that the acid be reacted with another monomer to prevent the acid from ionizing and thus imparting an anionic nature to the polymer which would inhibit deposition at the cathode. However, when the carboxyl groups are reacted, there can be no subseqeunt utilization of the carboxyl groups to aid in crosslinking the polymer to obtain a hard, durable coating.

DESCRIPTION OF THE INVENTION

It has now bee found that an aqueous coating composition comprising a non-gelled, acid-solubilized, carboxyl-containing acrylic interpolymer can be deposited on a cathode to provide coatings having highly desirable properties. The carboxyl groups of the polymers of this invention are not reacted but remain intact to be subsequently reacted, after, deposition, with a cross-linking resin.

The interpolymers of the present invention are novel in that they are prepared by interpolymerizing the desired monomers, including an unsaturated carboxylic acid monomer in the presence of an acid-solubilizing agent having an ionization constant greater than that of the particular unsaturated carboxylic acid employed. By polymerizing in the presence of the stronger acid, more of the unsaturated carboxylic acid may be polymerized into the polymer backbone without gelling the product.

The exact mechanism by which the carboxyl groups of these acrylic interpolymers are prevented from ionizing is not certain, however, it is believed that the ionization of the carboxyl groups is suppressed by employing an acid solubilizing agent during the polymerization having an ionization constant greater than that of the particular unsaturated carboxylic acid employed. Thus, where the acid-solubilizing agent has the greater ionization constant, the proton activity of the carboxyl group is suppressed and ionization is largely prevented. During deposition, the acid protonated acrylic interpolymer migrates under the electrical potential to the cathode, where it is deposited. The protons from the acid solubilizing agent are released into the aqueous composition to form free hydrogen. When so deposited, the carboxyl groups in the interpolymer remain intact, readily available as cross-linking sites, or as catalysts for the hydroxyl groups of the interpolymer and aldehyde condensation products of melamine, urea or benzoguanamine.

The acrylic interpolymer employed in this invention comprises an alkyl ester of acrylic or methacrylic acid, or a mixture of such esters; a tertiary or secondary nitrogen-containing alpha, beta-ethylenically unsaturated aminoalkyl monomer; a mono-ethylenically unsaturated carboxylic acid; and usually other copolymerizable ethylenically unsaturated monomers.

Examples of alkyl esters that may be employed include such alkyl acrylates and methacrylates as ethyl, methyl, propyl, butyl, hexyl, ethylhexyl and lauryl acrylates and methacrylates, as well as similar esters having up to about 20 carbon atoms in the alkyl group. Also, hydroxyalkyl esters can readily be employed. Examples of such hydroxyalkyl esters include 2-hydroxyethyl acrylate, 2-hydroxypropyl acrylate, 3-hydroxypropyl acrylate, 2-hydroxyethyl methacryalte, 2-hydroxypropyl methacrylate, 3-hydroxypropyl-4-hydroxybutyl methacrylate, and mixtures of such esters having up to about 5 carbon atoms in the alkyl group. In some instances, corresponding esters of other unsaturated acid, for example, ethacrylic acid, crotonic acid, and other similar acids having up to about 6 carbon atoms can be employed.

The tertiary nitrogen containing alpha, beta-ethylenically unsaturated aminoalkyl monomers that may be utilized include acrylate and methacrylate esters having 1 to 6 carbon atoms in the alkyl radical, such as the aminomethyl, aminopropyl and aminohexyl esters; mono-N,N-di($C_1$–$C_4$ alkylamino)-($C_1$–$C_6$ alkyl) esters, such an mono-(N,N-dimethylamino) ethyl ester, mono-(N,N-dimethylamino) ethyl ester ester and mono-(N,N-dimethylamino)hexyl ester. Also, monomers wherein the vinyl group is attached to the following radicals which include 2H-pyrrolyl, pyrrolyl, imidazolyl, pyrazolyl, pyridyl, pyrazinyl, pyrimidinyl, and the like are generally employed. Examples of such monomers include two monomers that have been found to be particularly useful in producing the acyrlic polymers utilized herein are N,N-dimethylaminoethyl methacrylate and N-vinylimidozole. Likewise, secondary nitrogen containing alpha, beta-ethylenically unsaturated aminoalkyl monomers may readily be employed. These include those having acrylate and methacrylate esters having 1 to 6 carbon atoms in the alkyl radical, such as aminoethyl, aminopropyl, and aminohexyl esters, and the like. Also monomers wherein the vinyl group is attached to the following radicals which include pyrrolyl, imidazlyl, pyrazolyl, pyridyl, pyrazinyl, pyrimidinyl and the like may be employed and at least one of the substituted groups may be aliphatic (alkyl), alicyclic, aromatic (aryl), aromatic-substituted aliphatic (aralkyl) or heterocyclic. Also, in some instances, alpha, beta-unsaturated primary amines have been useful. However, for purposes of this invention, the tertiary nitrogen containing alpha, beta-ethylenically unsaturated aminoalkyl monomers are preferred.

The preferred monoethylenically unsaturated acid used in producing the interpolymers of this invention is acrylic or methacrylic acid, although other unsaturated monocarboxylic and dicarboxylic acids of up to about 6 carbon atoms, such as maleic acid, fumaric acid, crotonic acid, methyl hydrogen fumarate, butyl hydrogen maleate, 3-butenoic acid, angelic acid, tiglic acid, and itaconic acid and the like may be used. The unsaturated acid content is generally from about 1 to 15 percent based on weight of the interpolymer solids content, however, the method herein is particularly suited for preparing interpolymers having an unsaturated acid content of at least 8 percent.

Some examples of additional copolymerizable ethylenically unsaturated monomers that may be employed include monoolefinic and diolefinic hydrocarbons, such as styrene, alpha-methyl styrene, vinyl toluene, isobutylene, 2,3-dimethyl hexane-1, butadiene-1,3 and the like; halogenated monoolefinic and diolefinic hydrocarbons such as alpha-chlorostyrene, alpha-bromostyrene, parafluorostyrene, cloroethylene, chlorobutadiene and other halogenated diolefinic compounds; esters of organic and inorganic acids, such as vinyl acetate, vinyl propionate, isopropenyl acetate, vinyl chloride, allyl chloride, vinyl alpha-cloroacetate, dimethyl maleate and the like; organic nitriles such as acrylonitrile, methacrylonitrile, ethacrylonitrile, crotonitrile and the like.

The above polymerizable monomers are mentioned as representative of the

containing monomers which may be employed; essentially any such copolymerizable monomer can be used The interpolymers employed in this invention are usually comprised of the hereinabove-described monomers in the following amounts, based on the solids content of the interpolymer: (a) from about 40 to about 94 percent by weight of the alkyl esters of acrylic or methacrylic acid; (b) from about 5 to about 25 percent of weight of a tertiary or secondary nitrogen-containing alpha, beta-ethylenically unsaturated aminoalkyl unsaturated monomer; (c) from about one to about 15 percent of the monoethylenically unsaturated carboxylic acid; and (d) from 0 to about 30 percent by weight of one or more other copolymerizable ethylenically-unsaturated monomers.

Generally, the amount of the monomers employed is not critical and may be varied somewhat depending on what properties are desirable. However, in some instances certain molar ratios should be maintained, for example, if the cationic resin is to be subsequently crosslinked with an acid catalyzed crosslinking agent, the number of carboxyl groups from the monoethylenically unsaturated carboxylic acid should at least be equal to the number of tertiary nitrogen-containing groups to provide optimum cure. Otherwise, the interpolymer may not deposit on the cathode or on deposition would be basic in nature and proper cure with the acid-catalyzed crosslinking agent could be inhibited. However, on the other hand, it may be desirable to employ less acid if a base-catalyzed crosslinking agent is employed.

As hereinbefore mentioned, the interpolymers are solubilized with a suitable acid having an ionization constant greater than that of the copolymerized acid of the interpolymer. This solubilizing acid is present during the interpolymerization process.

Electrodepositable compositions, while referred to as "solubilized," in fact are considered a complex solution, dispersion or suspension or combination of one or more of these classes in water, which acts as an electrolyte under the influence of an electric current. While, no doubt, in some circumstances the vehicle resin is in solution, it is clear that in some instances, and perhaps in most, the vehicle resin is a dispersion which may be called a molecular dispersion of molecular size between a colloidal suspension and a true solution.

Examples of solubilizing acids thay may be utilized include (a) inorganic acids such as hydrofluoric, phosphoric, sulfuric, and the like; (b) aliphatic acids such as formic, acetic, lactic, propionic, butyric, glycolic, isobutyric, trans-crotonic, malonic, and the like; and (c) aromatic acids such as benzoic, m-nitrobenzoic, o-phthalic, o-toluic, m-toluic, o-phenylenediacetic, o-chlorobenzoic, gallic, phenylacetic, trans-cinnamic, p-toluic, o-iodobenzoic, and the like. The solubilizing acids set forth above are not intended to be all inclusive, but are only to be considered as representative of many other similar acids which may readily be employed. The particular solubilizing acid employed may be varied somewhat depending on its strength, the strength of the monoethylenically unsaturated carboxylic used in the interpolymer, and the desired results.

For example, where the copolymerized acid is acrylic acid having an ionization constant of $5.50 \times 10^{-5}$, useful solubilizing acids include formic and malonic. However, when the acid is copolymerized, the ionization constant is probably somewhat lower and not all the acid groups are available for neutralization because they may be inaccessible. Using methacrylic acid, solubilization may be carried out with acids such as lactic and o-phthalic.

As previously pointed out, it is essential that the solubilizing acid in the present invention be present during the interpolymerization of the selected monomers so as to suppress the ionization of the unsaturated carboxylic acid, thus providing for an interpolymer having a substantial amount of unsaturated acid incorporated therein.

The amount of solubilizing acid employed to neutralize the interpolymer is also somewhat flexible, for example, an acid sufficient to protonate from about 25 to about 200 percent of the amino-containing groups of the hereinabovedescribed interpolymer can successfully be employed. However, the preferred degree of neutralization is from about 75 to about 150 percent, as it has been found that more stable cathodic coating compositions can be obtained at these levels of neutralization.

The interpolymers herein are usually prepared by first heating to reflux an organic solvent containing the acid solubilizing agent and subsequently — adding a monomer-catalyst mixture to the organic solvent over a period of time. The monomer mixture may also contain a minor amount of an organic solvent to facilitate polymerization. In some instances where desirable the entire polymerization may be carried out in the presence of an organic solvent and subsequently a portion of said solvent may be removed by a solvent exchange technique and then be replaced by a different solvent. The organic solvent may be a single solvent or a mixture of solvents. Mixtures of ethyl Cellosolve and butyl Cellosolve or ethyl Cellosolve and ispropyl alcohol are a preferred solvent system, but the invention is not limited to the specifically-named solvents, since many other solvents are available and useful, such as toluene, methyl ethyl ketone, methyl isobutyl ketone, acetone, butyl acetate, 2-ethoxy ethanol, 2-butoxyethanol, and the like. Thus, the reflux temperature will depend somewhat on the solvent system selected.

The mechanical apparatus utilized in the manufacture of the resinous interpolymer consists of that commonly known in the art. Generally, the monomers are admixed with sufficient catalyst and a chain transfer agent and fed into a reaction vessel equipped with continuously operating electrical or air-operated stirrer; a thermometer; a heating-jacket mantel; and a reflux trap.

It is desirable that, when the monomers are admixed, they be interpolymerized immediately as the aminoalkyl monomer will tend to react with the unsaturated carboxylic acid. A preferred way of making the interpolymers herein is to physically separate the aminoalkyl monomer from the other monomers and to add them independently, yet simultaneously, to the refluxing refluxing In this manner, one can provide for a more random interpolymer and yet substantially prevent any side reaction between the amino-alkyl monomer and unsaturated carboxylic acid monomer. The same result can be obtained by separating the unsaturated carboxylic acid monomer from the other monomer. The utilization of dropping funnels is a convenient method of separating the aminoalkyl monomer from the unsaturated carboxylic acid monomer.

The temperature employed to conduct the polymerization herein may vary depending on the selection of monomers, catalysts and amounts and the refluxing solvent system. Generally temperatures from about 80°C. to about 150°C. may be employed. However, the preferred range is from about 115°C. to about 130°C.

In carrying out the polymerization reaction, a peroxygen type catalyst is ordinarily utilized. Useful catalysts for this purpose include acetal benzoyl peroxide, cyclohexyl hydroperoxide, cumene hydroperoxide, acetyl peroxide, lauryl peroxide, di-t-butyl peroxide, peracetic acid, t-butyl permaleic acid, di-t-butyl diperphthalate, and the like. Azo compounds, such as p-methoxyphenyl diazothio (2-naphthyl)ether and alpha, alpha'-azobisisobutyronitrile, may also be used, as may any redox catalyst system. The quantity employed may vary considerably; however, in most instances, it is desirable to utilize from about 0.1 to about 2.0 percent by weight, based upon the monomeric components.

In many instances, it is also desirable to add a chain transfer or "short-stopping" agent to the polymerization mixture. Mercaptans are conventionally used for this purpose, but other chain modifying agents, such as cyclopentadiene, allyl carbamate, alpha methyl styrene and the like can also be used to secure low molecular weights, as can unsaturated fatty acids or esters.

Preceding, following or during neutralization of the interpolymer, a crosslinking agent is generally employed which is acid catalyzed and heat curable. The amount of crosslinking agent employed usually is from about 5 to about 30 percent of the total vehicle solids, although more or less can be used in some instances. Examples of such crosslinking agents include amine resins, epoxy resins, phenolic resins, isocyanates, hydroxyl-terminated polyesters and the like. The preferred crosslinking agents include condensation products of formaldehyde with melamine, urea or benzoguanamine.

After the resin dispersion is deposited, the carboxyl groups from the monoethylenically unsaturated carboxylic are free to react with the crosslinking agent when heated to a suitable temperature.

The neutralized interpolymers are dispersed in water. The concentration depends upon the use intended and, in general, is not critical for electrodeposition purposes. The major proportion of the dispersed composition is water, and in most cases the composition contains from about one to about 25 percent by weight of the resin. In many instances, the dispersed compositions may be pigmented in desired proportions of most conventional type pigments, for example, iron oxide, lead oxide, carbon black, titanium dioxide, talc, barium sulfate, as well as color pigments such as cadmium red, phthalocyanine blue, toluidine red, chromic yellow and the like. Various other additives that may be added include antioxidants, surface-active agents, fungicides, bactericides, wetting agents, anti-foaming agents and the like.

In formulating the coating composition, ordinary tap water may be employed, but where such water contains a relatively high level of metals and cations, deionized water, i.e. water from which free ions have been removed by the passage through ion exchange resins, is preferable.

In the electrodeposition processing employing the water-dispersed coating compositions described above, the aqueous coating composition is placed in contact with electrically-conductive electrodes, with the surface to be coated being the cathode. Upon the passage of the electric current between the anode and the cathode in contact with the coating composition, an adherent film of the coating composition is deposited on the cathode. The conditions under which the electrodeposition step herein is carried out are those conventionally used for the electrodeposition of coatings.

The method of the invention is applicable to coating any conductive substrate, such as steel, aluminum, copper, zinc, nickel and the like.

The invention is further described in conjunction with the following examples, which are to be construed as illustrative rather than limiting. All parts and percentages are by weight unless otherwise indicated.

Below are examples of the preparation of various interpolymers which are embodiments of this invention. The interpolymers are made by conventional methods well known in the art.

INTERPOLYMER A

In this Example the interpolymer was prepared in the presence of lactic acid.

The following components were charged into a reactor equipped with a condenser, stirrer, thermometer, and dropping funnel:

|  | Parts by Weight |
| --- | --- |
| Ethyl Cellosolve | 673.0 |
| Isopropyl alcohol | 247.0 |
| Lactic acid solution (85% in water) | 234.0 |

The reactor contents were heated to reflux and the following mixture was added by means of a dropping funnel over a 3-hour period:

| Butyl acrylate | 1350.0 |
| --- | --- |
| Styrene | 657.0 |
| Ethyl acrylate | 405.0 |
| Methacrylic acid | 135.0 |
| Tertiary dodecyl mercaptan | 80.0 |
| Alpha, alpha'-azobisisobutyronitrile | 40.0 |

Simultaneously, over this three hour period, 270 parts of dimethylaminoethyl methacrylate were also added. Then three separate additions of a mixture of 4.5 parts t-butylperoxyisopropyl carbonate and 10.0 parts ethyl Cellosolve were added at one hour intervals. After the last addition, the reaction was allowed to continue for two hours and then cooled.

The interpolymer so produced had the following characteristics:

| Solids content (percent) | 69.7 |
| --- | --- |
| Viscosity (centipoises, Brookfield No. 4 spindle at 20 rpms.) | 46,000 |
| Acid number | 31.2 |

INTERPOLYMER B

Interpolymer B was produced in a manner similar to that of Interpolymer A, except that 78 parts of lactic acid and 1,350 parts of dimethylaminoethyl methacrylate were employed.

This interpolymer had the following characteristics:

| Solids content (percent) | 65.2 |
| --- | --- |
| Viscosity (centipoises, Brookfield No. 4 spindle at 20 rpms.) | 64,000 |
| Acid number | 46.7 |

INTERPOLYMER C

Interpolymer C was produced from the same components as Interpolymer B except that Interpolymer C employed 351.0 parts of lactic acid, 1215.0 parts butyl acrylate, 40.0 parts alpha, alpha'-azobisisobutyronitrile as the sole catalyst and 1350.0 parts dimethylaminoethyl methacrylate. Interpolymer C had the following characteristics:

| Solids content (percent) | 65.6 |
| --- | --- |
| Viscosity (centipoises, Brookfield No. 7 spindle at 10 rpms. | 200,000 |
| Acid number | 75.13 |

INTERPOLYMER D

The monomers listed below were interpolymerized in the presence of lactic acid.

The following components were charged into a reactor:

|  | Parts by Weight |
| --- | --- |
| Ethyl Cellosolve | 673.0 |
| Butyl Cellosolve | 247.0 |
| Lactic acid solution (85% in water) | 270.0 |

The reactor contents were heated to reflux (115°–102°C.) and the following mixture was added by means of a dropping funnel over a three-hour period.

| Ethyl acrylate | 1215.0 |
| --- | --- |
| Styrene | 729.0 |
| Methacrylic acid | 54.0 |
| 2-Hydroxyethyl acrylate | 405.0 |
| Alpha, alpha-azobisisobutyronitrile | 40.0 |

Simultaneously over this three-hour period, 270.0 parts of N-vinyl-imidazole were also added. Then three separate additions of 4.5 parts of t-butylperoxyisopropyl carbonate and 10.0 parts ethyl Cellosolve were added at one hour intervals. After the last addition, the reaction was allowed to continue for two hours and then cooled.

Interpolymer D had a solids content of 64.7 percent and an acid number of 39.07.

INTERPOLYMER E

Interpolymer E was produced in a manner similar to that of Interpolymer D, except that the reactor was charged with 673.0 parts n-butanol, 247.0 parts butyl Cellosolve and 319.0 parts lactic acid; the first three hours addition included 1215.0 parts butyl acrylate, 675.0 parts styrene, 405.0 parts hydroxyethyl acrylate, 202.0 parts methacrylic acid and 40.0 parts alpha, alpha-azobisisobutyronitrile; and 202.0 parts N-vinylimidazole.

Interpolymer E had a solids content of 61.0 percent, viscosity of 241,000 centipoises and an acid number of 60.1.

EXAMPLE I

The following were mixed:

| | Parts by Weight |
|---|---|
| Interpolymer B (above) | 492.0 |
| Epoxy resin* | 36.0 |
| Deionized water | 3072.0 |

*Made from epichlorohydrin and Bisphenol A, having an average molecular weight of 380 and an epoxide equivalent of 185-192 (Epon 828).

The composition had a pH of 3.88 and a conductivity of 830 mmhos. A suitable electrodeposition bath was filled with the composition and the bath temperature was maintained at about 80°F. during deposition. Films were deposited on zinc phosphatized steel electrodes employing a range of voltages (75-250) for a deposition period of about 90 seconds. The resulting films, after curing for 20 minutes at 350°F., ranged from about 0.5 to 1.5 mils in thickness. The films produced in this manner were clear, hard and adherent.

EXAMPLE II

| | Parts by Weight |
|---|---|
| Interpolymer B (above) | 492.0 |
| Hexakis(methoxymethyl)melamine | 36.0 |
| Deionized water | 3072.0 |

This composition had a pH of 3.85 and a conductivity of about 900 micromhos. Panels coated with this composition had good flow characteristics and were well cured on baking 20 minutes at 350°F.

EXAMPLE III

Example III was a pigmented composition which was formulated in the following manner:

PASTE:

| Interpolymer B | 192.0 |
|---|---|
| Deionized water | 430.0 |
| Titanium dioxide | 504.0 |

The above paste was ground by conventional means and used to produce an electrodepositable composition by mixing the following:

| Interpolymer B | 306.0 |
|---|---|
| Hexakis(methoxymethyl)melamine | 55.4 |
| Deionized water | 171.6 |
| Paste (above) | 187.0 |
| Deionized water | 2880.0 |

This composition had a pigment-to-binder ratio of 0.3:1.0 and a solids content of 10 percent. When electrodeposited at 125 volts for 90 seconds, substantial uniform films of useful properties were obtained.

The examples hereinabove may be varied and modified to produce the particular properties desired. For example, Interpolymers A, B, C, D and E or combinations thereof may be employed instead of Interpolymer A. The monomer ratios of the various interpolymers hereindescribed may be changed or other monomers may be employed to make suitable compositions.

Also, the crosslinking agent proportion or type can be modified or changed; for example, other amine resins, such as those made from urea or benzoguanamine, can readily be substituted to produce desirable results. Other epoxy resins, such as epoxidized oils or epoxidized cycloaliphatic compounds, can also be used as can phenol-formaldehyde resins, and other crosslinking agents as mentioned above.

Various pigment combinations are likewise possible. When employing the resins of this invention for special coating compositions, other pigments such as talc, barium sulfate, cadmium red, chromic yellow and the like may be utilized to replace or employed in addition to titanium dioxide, as employed in Example III.

In addition to the above-enumerated substitutions and combinations, various other additives may be included in the formulation of the electrodepositable composition. Other additives include fungicides, wetting agents, anti-oxidants and the like, which are commonly known and available in the art.

According to the provisions of the Patent Statutes, there are described above the invention and what are now considered its best embodiments; however, within the scope of the appended claims, it is to be understood that the invention can be practiced otherwise than as specifically described.

We claim:

1. A method of preparing a cationic electrodepositable, non-gelled, carboxyl-containing, thermosetting acrylic interpolymer comprising interpolymerizing the following monomers:
   A. from about 40 to about 94 percent by weight of an alkyl ester of acrylic or methacrylic acid;
   B. from about 5 to about 25 percent by weight of an alpha, betaethylenically unsaturated amino-alkyl monomer, wherein said amino group is selected from the class consisting of a secondary amine and a tertiary amine;
   C. from about 1 to about 15 percent of a monoethylenically unsaturated carboxylic acid; and
   D. from 0 to about 30 percent by weight of a copolymerizable ethylenically unsaturated monomer, wherein said percents by weight are based on the solids content of the interpolymer, and wherein the interpolymerization is carried out in the presence of an acid solubilizing agent, wherein said acid has an ionization constant greater than the ionization constant of said unsaturated carboxylic acid, and is present in an amount sufficient to protonate from about 25 to about 200 percent of the amine groups of said interpolymer.

2. The method as in claim 1 wherein the solubilizing agent is an aliphatic acid.

3. The method as in claim 2 wherein said aliphatic acid is lactic acid.

4. The method as in claim 1 wherein said alkyl ester is a member of the class consisting of methyl acrylate, ethyl acrylate, butyl acrylate, hydroxyethyl acrylate, butyl methacrylate, ethyl methacrylate and 2-hydroxyethyl methacrylate.

5. The method as in claim 1 wherein said tertiary alpha, betaethylenically unsaturated aminoalkyl monomer is a member of the class consisting of N,N-dimethylaminoethyl methacrylate and N-vinylimidazole.

6. The method as in claim 1 wherein said monoethylenically unsaturated carboxylic acid is a member of the class consisting of acrylic and methacrylic acid.

7. The method as in claim 1 wherein said copolymerizable ethylenically unsaturated monomer is a member of the class consisting of styrene, butyl acrylate, 2-ethylhexyl acrylate and acrylonitrile.

8. The product of the process of claim 1.

9. The method as in claim 1 wherein the monomers are added to a refluxing mixture comprising an organic solvent and said acid solubilizing agent, wherein said solubilizing agent is in the form of an aqueous solution.

10. The method as in claim 9 wherein the alpha, beta-ethylenically unsaturated aminoalkyl monomer is separate from, but added simultaneously with, a mixture of monomers (A), (C) and (D).

11. The method as in claim 1 wherein (C) is at least 8 percent of the interpolymer solids content.

12. The product of the method of claim 9.

* * * * *

PO-1050
(5/69)

UNITED STATES PATENT OFFICE
CERTIFICATE OF CORRECTION

Patent No. 3,853,803             Dated December 10, 1974

Inventor(s) Carl C. Anderson et al

It is certified that error appears in the above-identified patent and that said Letters Patent are hereby corrected as shown below:

Abstract
line 1, "carboxy" should read --carboxyl--;

Column 1, line 64, "bee" should read --been--;

Column 2, line 55, "acid" should read --acids--;

Column 2, line 64, "an" should read --as--;

Column 2, line 66, "ester" is repeated;

Column 3, line 67, "of" should be --by--;

Column 4, line 39, "thay" should be --that--;

Column 5, line 27, "ispropyl" should be --isopropyl--;

Column 5, line 49, "refluz-" should be --reflux--;

Column 5, line 50, "refluxing" should be --solvent--;

Column 6, line 57, "processing" should be --processes--;

Column 7, line 32, "657.0" should be --675.0--.

Signed and sealed this 11th day of March 1975.

(SEAL)
Attest:

RUTH C. MASON
Attesting Officer

C. MARSHALL DANN
Commissioner of Patents
and Trademarks